United States Patent [19]
Sarkar

[11] Patent Number: 5,845,330
[45] Date of Patent: Dec. 1, 1998

[54] USING AN INTERMEDIATE STORAGE MEDIUM IN A DATABASE MANAGEMENT SYSTEM

[75] Inventor: Debabrata Sarkar, Milpitas, Calif.

[73] Assignee: Sun Microsystems, Inc., Palo Alto, Calif.

[21] Appl. No.: 674,857

[22] Filed: Jul. 3, 1996

[51] Int. Cl.$^6$ .............................. G06F 12/00; G06F 7/00
[52] U.S. Cl. ............................... 711/159; 711/117; 707/1
[58] Field of Search .................................. 395/440, 444, 395/445, 449, 460, 461, 463, 486, 487, 601; 711/113, 117, 118, 122, 133, 134, 136, 159; 707/1

[56] References Cited

U.S. PATENT DOCUMENTS

| | | | |
|---|---|---|---|
| 4,020,466 | 4/1977 | Cordi et al. ............................. | 707/201 |
| 5,237,673 | 8/1993 | Orbits et al. ............................ | 711/170 |
| 5,440,712 | 8/1995 | Takeda .................................... | 711/117 |
| 5,584,012 | 12/1996 | Kojima et al. .......................... | 711/122 |
| 5,644,766 | 7/1997 | Coy et al. ................................ | 707/204 |

OTHER PUBLICATIONS

Young, H.C. et al. "Computer Architecture for Commerical Workloads". 26th Asilomar Conference, pp. 56–60, 1992.

Primary Examiner—Tod R. Swann
Assistant Examiner—Conley B. King, Jr.
Attorney, Agent, or Firm—Graham & James LLP

[57] ABSTRACT

A database management system incorporating an intermediate level of storage medium. Software of the DBMS controls the transfer of data between a primary, secondary and intermediate storage mediums. This transfer is under control of the DBMS and is not transparent to the DBMS. The intermediate storage medium has an access time that is shorter than the access time of the secondary storage medium. During operation of the DBMS, data is read from the secondary storage medium and held in the primary storage medium until the storage medium is full. Thereafter, as additional data is read by the DBMS from the database stored on the secondary storage medium, data is transferred to the intermediate storage medium under control of the DBMS, thus preserving the benefit of having the data read into the primary storage medium.

11 Claims, 6 Drawing Sheets

```
read ()
  ...
  lookup_buffer_cache;                                     — 202
  if (present)                                             — 204
        return buffer to caller                            — 206
  else
        lookup_buffer_cache2                               — 208
        if (present)                                       — 210
              get a free buffer from primary storage medium;  — 212
              move intermediate storage to primary storage buffer; — 213
              return buffer to caller                      — 214
        else                                               — 216
              get a free buffer from primary storage medium; — 218
              do a physical read into buffer               — 220
              return buffer to caller
        end
end Get_a_free_buffer()

if there is a free buffer                                — 222
        return a free buffer                               — 224
  else
        find a buffer not used for a long time;            — 230
        copy the buffer from primary storage medium to intermediate storage medium;  — 232
        discard the contents of the buffer;                — 234
        record the info that the page is gone              — 236
```

Fig. 1

```
read ()
...
lookup_buffer_cache;                              — 202
if (present)            — 204
                                  — 206
        return buffer to caller
else
                              — 208
        lookup_buffer_cache2   — 210
        if (present)
                                                           — 212
                get a free buffer from primary storage medium;      — 213
                move intermediate storage to primary storage buffer;
                return buffer to caller           — 214
        else                                               — 216
                get a free buffer from primary storage medium;  — 218
                do a physical read into buffer  — 220
                return buffer to caller
        end
end
```

Fig. 2(a)

```
Get_a_free_buffer()
                            — 222
        if there is a free buffer
                return a free buffer   — 224
        else                                   — 230                        — 232
                find a buffer not used for a long time;
                copy the buffer from primary storage medium to intermediate storage medium;
                discard the contents of the buffer;   — 234
                record the info that the page is gone  — 236
```

Fig. 2(b)

FIG. 3(a) Before read X

FIG. 3(b) After read X; Before read Y

FIG. 3(c) After read Y

USING AN INTERMEDIATE STORAGE MEDIUM IN A DATABASE MANAGEMENT SYSTEM

FIELD OF THE INVENTION

This application relates to database management systems and, more particularly, to a database management system incorporating an intermediate storage medium.

BACKGROUND OF THE INVENTION

Modern databases (DBs) include extremely large amounts of data For example, a modern database typically may contain 300 gigabytes (approximately three hundred billion bytes) of data. It is expected that databases will become even larger in the future. Unfortunately, the memories of computer systems often are not large enough to hold all of the data in a database at one time.

Not all data processing systems allow a database management system to access the maximum amount of memory allowed by its hardware. For example, a high end server may have a 64 bit address length. Even though the hardware has a 64 bit address length and, thus, is theoretically capable of supporting an address space of up to 30 gigabytes, certain operating systems can support no more than 4 gigabytes for a single software application Moreover, sometimes there are not enough physical memory slots in the computer to allow the maximum amount of addressable memory.

Similarly, a low-end server may have a 32 bit address and, therefore, theoretically be capable of addressing up to 4 gigabytes of main memory. However, restrictions of the operating system or a lack of memory slots may mean that primary memory is actually limited to less than 1 gigabyte. The entire contents of a large database will not fit into the main memory of a conventional computer. Thus, databases are often stored on a secondary storage medium, such as a hard disk.

Conventional databases have long had to deal with the memory restrictions of the hardware on which they are executing. Conventional database management systems (DBMSs) bring portions of the database into primary storage/main memory from secondary storage when those portions are needed by the DBMS. If the primary storage cannot hold the entire database at once, however, the DBMS must manage the data, swapping it in and out of main memory as needed. This operation is called "paging."

Some computer systems employ the concept of hardware paging. Such hardware paging places a "fast" storage medium between a slow non-volatile secondary storage and the computer system. Whenever data is read from the secondary storage, the data is also placed in the fast storage medium. Thus, whenever the computer system performs a read operation of secondary storage, the fast storage medium is searched first to determine whether the desired information has previously been placed in the fast storage medium. The existence of the fast storage medium is completely transparent to the application software, which does not "know" that the fast storage medium exists and does not "know" when the data comes from the fast storage medium instead of from the secondary storage. Thus, the fast storage medium is not visible to software executing on the computer system. Such arrangements simply allow the system to deliver faster results than would otherwise be expected.

A problem involved with hardware paging is that once the fast storage medium is full, old data must be purged from the fast storage medium in order to make room for new data. When old data that has been written to (i.e., "dirty" data) is purged, it is written to the larger secondary storage medium. Because the secondary storage medium is relatively slow, the benefit of previously bringing the data into the fast storage medium is lost for that data.

SUMMARY OF THE INVENTION

The present invention overcomes the problems and disadvantages of the prior art by introducing an intermediate level of storage medium in a database management system (DBMS). An embodiment of the present invention includes a large secondary storage medium, a smaller primary storage medium, and an intermediate storage medium that has a faster access time than the secondary storage medium. In a DBMS in accordance with the present invention, software in the DBMS controls the transfer of data between the primary, secondary, and intermediate storage mediums. This transfer is under control of the DBMS and is not transparent to the DBMS.

During operation of the DBMS, as data is read from the secondary storage medium, it is held in the primary storage medium until the primary storage medium is full. Thereafter, as additional data is read by the DBMS from the database stored on the secondary storage medium, data is transferred to the intermediate storage medium under control of the DBMS. This transfer makes room in the primary storage medium without completely losing the advantage of previously caching the data, since the intermediate storage medium is considerably faster than the secondary storage medium.

In a first embodiment of the present invention, the intermediate storage is an internal RAM disk or an extended memory. In a second embodiment of the present invention, the intermediate storage is embodied as an external RAM disk.

In accordance with the purpose of the invention, as embodied and broadly described herein, the invention is a method for accessing a database, comprising the steps, performed by a database management system stored in a secondary storage medium, of a data processing system, of: receiving a request to read database data located in the database; when a primary storage medium is full determining which database data needs to be discarded from the primary storage medium to make room for more data; storing the database data to be discarded into an intermediate storage medium; and reading the database data, after the storing step, into the primary storage medium from a one of the intermediate storage medium and the secondary storage medium.

In further accordance with the purpose of the invention, as embodied and broadly described herein, the invention is second an apparatus for accessing a database, comprising: a DBMS that manipulates data stored in the database; a primary storage medium; an intermediate storage medium having an access time; a secondary storage medium having a second access time that is longer than the first access time; and a data migration portion for, in accordance with a request from the DBMS, moving a piece of the data from the primary storage medium to the intermediate storage medium when the primary storage medium is full.

Advantages of the invention will be set forth in part in the description which follows and in part will be obvious from the description or may be learned by practice of the invention. The advantages of the invention will be realized and attained by way of the elements and combinations particularly pointed out in the appended claims.

BRIEF DESCRIPTION OF THE FIGURES

The accompanying drawings, which are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. Wherever possible, the same reference numbers will be used throughout the drawings to refer to the same or like parts.

Figure 1:
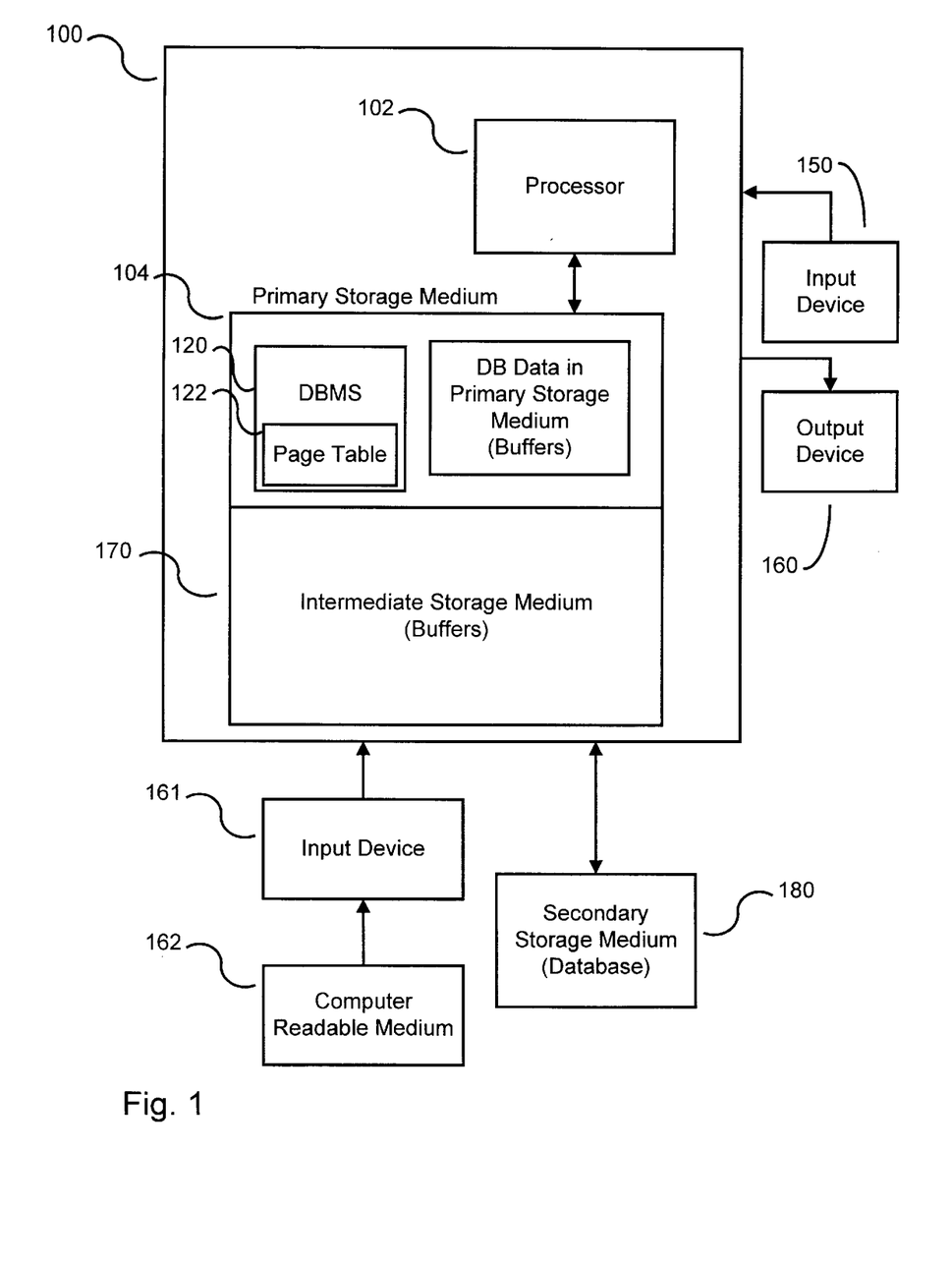
FIG. 1 (is a block diagram of a computer system in accordance with a first embodiment of the present invention.

FIG. 1 is a block diagram of a computer system 100 in accordance with a preferred embodiment of the present invention. Computer system 100 includes a processor 102; a primary storage medium 104; an intermediate storage medium 170; a secondary storage medium 180; an input device 150, such as a keyboard or mouse; and a display device 160, such as a display terminal. Primary storage medium 104, which includes buffer area 124, can include any type of computer memory including, without limitation, random access memory (RAM) and read only memory (ROM). Intermediate storage medium 170 can include, without limitation, an internal RAM disk or extended memory or any other appropriate type of storage internal to the primary storage medium. Accessing data from the primary storage medium 104 or the intermediate storage medium 170 by the DBMS may take, for example, 25 to 50 microseconds. Accessing data from the secondary storage medium 180 by the DBMS may take, for example, 8 to 10 milliseconds.

The described embodiment uses a 64 bit address and can support up to 30 gigabytes of primary storage. It is anticipated that future systems will have even larger memories. The invention can also, of course, operate in systems with smaller memories than that described herein The operating system of the described embodiment can address up to only 4 gigabytes of primary storage space per application, even though the hardware can support up to 30 gigabytes of address space. This extra memory space can be addressed indirectly—for example, through installing an internal RAM disk or using an extended memory or other appropriate memory. Other sizes of address space may be used in conjunction with an internal RAM disk or extended memory.

Secondary storage medium 180 can include, without limitation, magnetic and optical storage medium such as magnetic or optical disks. Secondary storage 180 stores the data of the database. Certain portions of this data are loaded into primary storage medium 104 and intermediate storage medium 170, as described below.

Computer system 100 further includes an input device 161 for reading a computer usable medium 162 having computer readable program code means embodied therein. Input device 161 is, for example, a disk drive or CD ROM drive. The computer readable program means may be, for example, a DBMS 120. Primary storage medium 104 includes DBMS 120. Primary storage medium 104 also includes a page table 122 and memory area 124 (e.g., memory buffers) for storing data loaded from the database of intermediate/secondary storage 170/180.

A person of ordinary skill in the art will understand that primary storage medium 104 also contains additional information, such as application programs, operating systems, data, etc., which are not shown in the figure for the sake of clarity. It will be understood by a person of ordinary skill in the art that computer system 100 can also include numerous elements not shown in the figure for the sake of clarity, such as additional disk drives, keyboards, display devices, network connections, additional memory, additional processors, LANs, input/output lines, etc. A preferred embodiment of the invention runs under the Solaris operating system, Version 2.5.1. Solaris is a registered trademark of Sun Microsystems, Inc. Other implementations can execute in conjunction with other appropriate operating systems and execution environments.

Figure 2A:
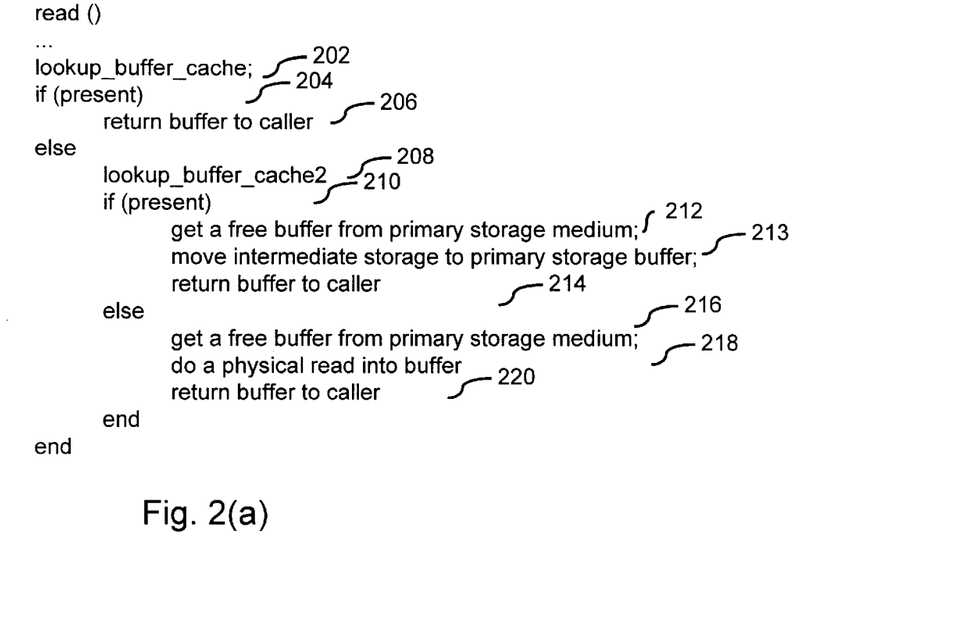
FIGS. 2(a) and 2(b) are examples of pseudo-code showing steps performed by a DBMS to read data from a database in accordance with the present invention.
Figure 2B:
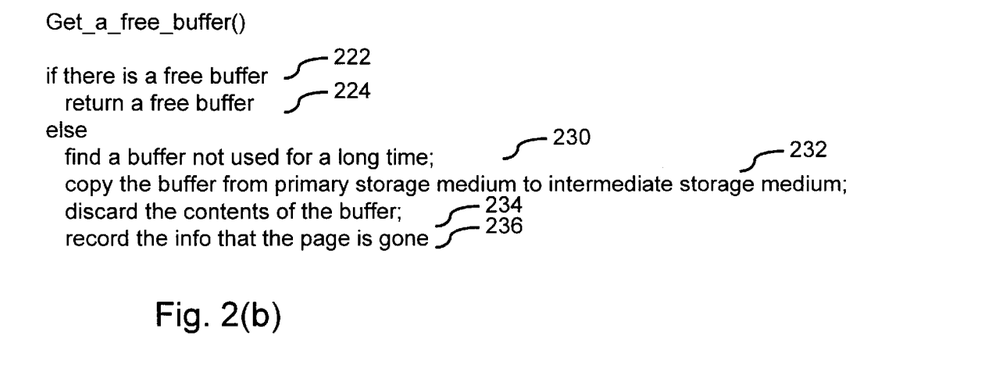

FIGS. 2(a) and 2(b) are examples of pseudo-code showing steps performed by DBMS 120 to read data from the database of secondary storage medium 180 in accordance with the present invention. It will be understood that the pseudo-code of FIG. 2 is preferably embodied by computer instructions stored in a memory of system 100 and executed by processor 102. The computer instructions are preferably stored in a library accessed/linked by DBMS 120.

FIG. 2(a) shows pseudo-code for a read operation. In the example, DBMS 120 has decided to read a piece of DB information that it "knows" is stored in a certain page of the database (e.g., page X). In line 202, the DBMS searches page table 122 to determine whether Page X is present in primary storage buffer area 124. In line 204, if Page X is present in primary storage area 124 then, in line 206, the DBMS retrieves from the page table a location in primary storage area 124 where Page X is stored (e.g., a buffer location in area 124).

Figure 4:
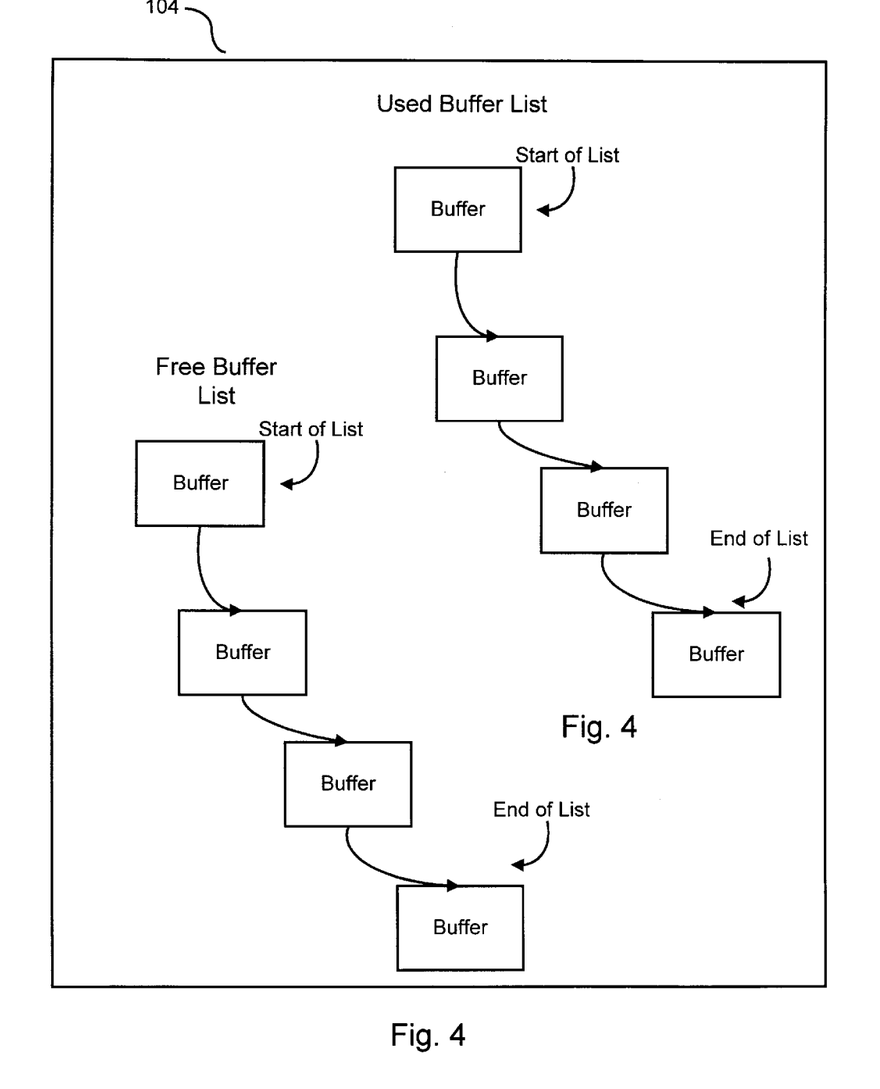
FIG. 4 shows an example of buffers used to store the database contents in a primary storage medium or an intermediate storage medium.

If Page X is not in primary storage area 124 then control passes to line 208. In line 208, the DBMS searches page table 122 to determine whether Page X is present in intermediate storage medium 170. In line 210, if Page X is present in intermediate storage medium 170 then, in line 212, the DBMS gets a free buffer in area 124, as described in connection with FIG. 2(b). In line 213, the DBMS retrieves from the page table a location in intermediate storage medium 170 where Page X is stored (e.g., a buffer location in intermediate storage medium 170). Examples of buffers in primary storage area 124 and in intermediate storage medium 170 are shown in FIG. 4. In the described embodiment, each storage medium 104 and 170 maintains a list of free(empty) buffers and a list of used buffers. Buffers are taken from the free list as they are needed. The DBMS copies the data from intermediate storage medium 170 to the empty buffer in primary storage area 124. In line 214, the DBMS returns the location in primary storage area 124 where Page X was placed (e.g., a buffer location in area 124) to the caller who requested the information.

If the data is not in the primary or intermediate storage media, then Page X is present in secondary storage medium

180. The DBMS proceeds to move the desired page from secondary storage medium 180 to a buffer in primary storage area 124. In line 216, the DBMS gets a free buffer in area 124, as described in connection with FIG. 2(*b*). In line 218, the DBMS does a physical read from secondary storage medium 180 into the free buffer in area 124. In step 220, the DBMS returns the buffer containing the results of the read to the caller who requested the information.

FIG. 2(*b*) shows pseudo-code for obtaining a free (empty) buffer in primary storage area 124. In lines 222 and 224, if there are free buffers in area 124, then one of these free buffers is returned to the calling routine. If there are not free buffers in area 124, in line 230, the DBMS finds a buffer in area 124 that contains data, but that has not been used for a long time. In a preferred embodiment, buffers are discarded in a "longest time since access" order, although any appropriate scheme could be used. In line 232, data in the buffer is moved from primary storage area 124 to intermediate storage medium 170. In line 234, the former contents of the buffer are cleared. This action leaves a free buffer in area 124. In line 236, the corresponding entry in page table 122 is cleared. The location of the free buffer in area 124 is returned to the calling routine.

Thus, in the described embodiment, data is read into primary storage medium 124 until that medium is full. Then, as additional data is read into primary storage medium, old data is moved from primary storage area 124 to intermediate storage medium 170 as needed to make room in primary storage area 124 for the new data. (Data may need to be purged from intermediate storage medium 170 to make room for the moved data). When a read operation is first performed, the DBMS looks for data in this order: primary storage area 124, intermediate storage medium 170, and secondary storage medium 180.

Figure 3A:
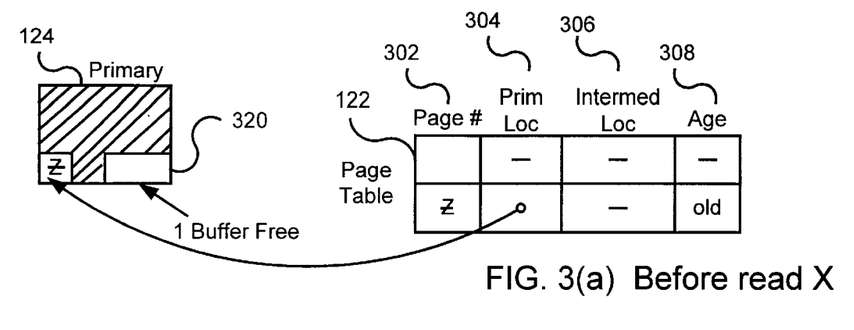
FIGS. 3(a) through 3(c) show an example of two successive reads from the database.
Figure 3B:
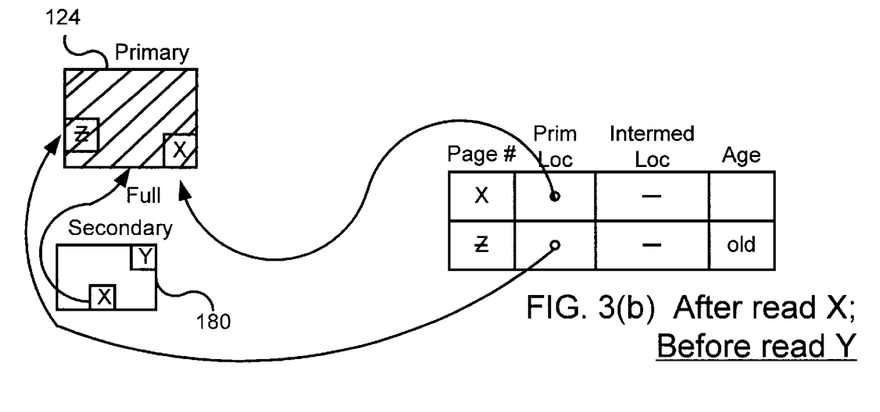
Figure 3C:
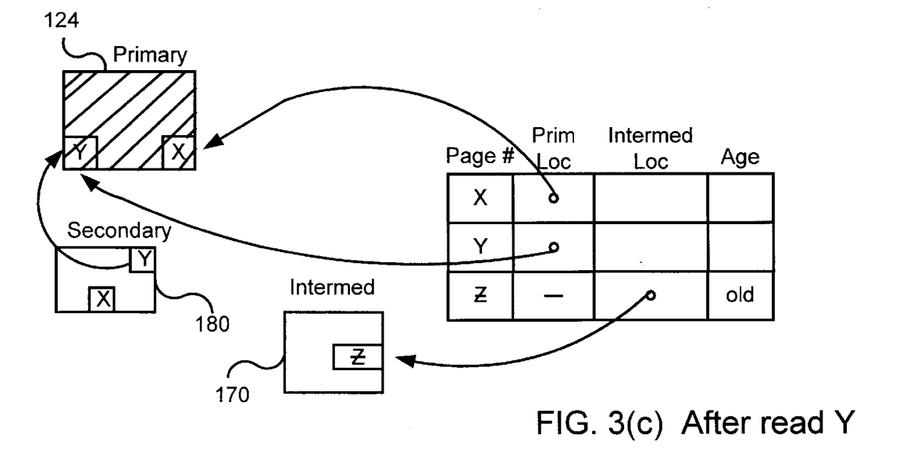

FIGS. 3(*a*) through 3(*c*) show an example of two successive reads from the database into primary storage medium 104/124. A first read requests Page X. A second read requests page Y. In FIG. 3(*a*), before X is read, page table 122 includes a page number field 302, a primary location field 304, an intermediate location field 306, and an age field 308. Other implementations can use two tables or could use other appropriate configurations for their page tables. In the example, before either of the read operations, primary storage medium has one free buffer 320. When the request to read Page X is received, the DBMS determines that Page X is not in the primary or intermediate storage media from examining the primary location field 304 and intermediate location field 306 of the page table. The DBMS then identifies the last free buffer in primary storage area 124 and copies Page X from secondary storage 180 to primary area 124. As shown in FIG. 3(*b*), the primary location field of the page table is adjusted to show that Page X is at this new location.

When the request to read Page Y is received, there are no more free buffers in primary storage area 124. Thus, an oldest buffer Z is moved from primary storage area 124 to intermediate storage medium 170 to make room for Page Y in primary storage area 124. The page table entries for Page Z and Page Y are altered to reflect the data movements.

In the described embodiment of the present invention, the DBMS always performs a write operation to secondary storage 180. Thus, page table 122 preferably contains a "dirty bit," indicating that the page has been written to (as is well-known). The write operation of the described embodiment is essentially the same as a conventional write operation.

FIG. 4 shows an example of buffers that can be used in primary storage area 124 and intermediate storage medium 170. In the described embodiment, each storage medium 104 and 170 maintains a list of free(empty) buffers and a list of used buffers. Buffers are taken from the free list as they are needed, in a manner known to persons of ordinary skill in the art.

Figure 5:
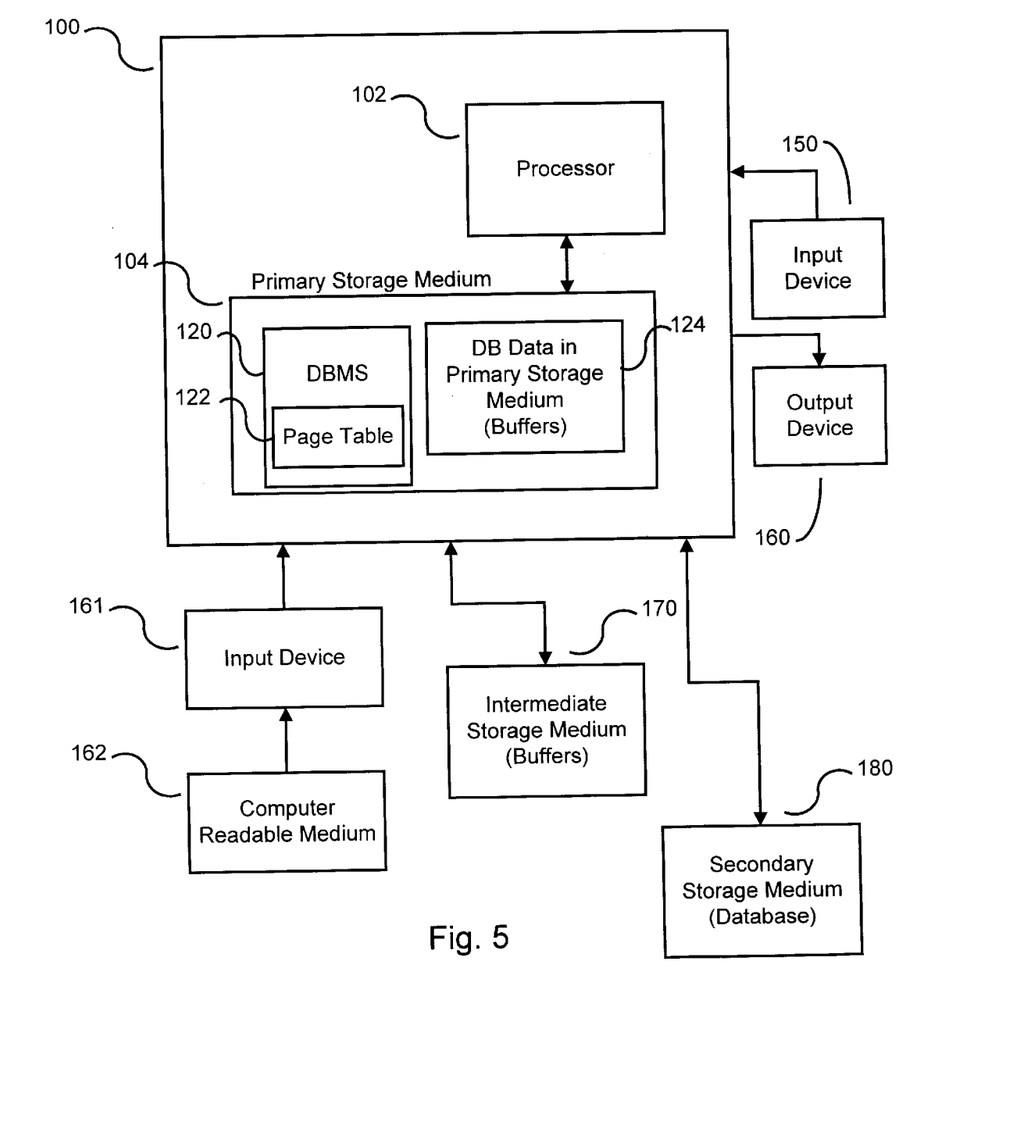
FIG. 5 is a block diagram of a computer system in accordance with a second embodiment of the present invention.

FIG. 5 shows a second preferred embodiment of the present invention. In the second embodiment, intermediate storage medium is an external RAM disk, such as the "Ceram disk" manufactured by Ceram, Inc. of Colorado Springs, Colo. or such as the "SCSI RAM disk," manufactured by Disk Emulations Systems (DES) of Santa Clara, Calif.

The operating system of the described embodiment, however, can address up to only 4 gigabytes of primary storage space per application, even though the hardware can support up to 30 gigabytes of address space. Other sizes of address space may be used in conjunction with an external RAM disk or extended memory. Accessing data from the primary storage medium by the DBMS may take, for example, 25 to 50 microseconds. Accessing data from the intermediate storage medium by the DBMS may take, for example, 100 to 150 microseconds. Accessing data from the secondary storage medium by the DBMS may take, for example, 8 to 10 milliseconds.

A preferred embodiment of the present invention, include more than one intermediate storage mediums. For example, several intermediate storage mediums having respectively longer access times could be included in the system in place of a single intermediate storage medium 170.

Figure 6A:
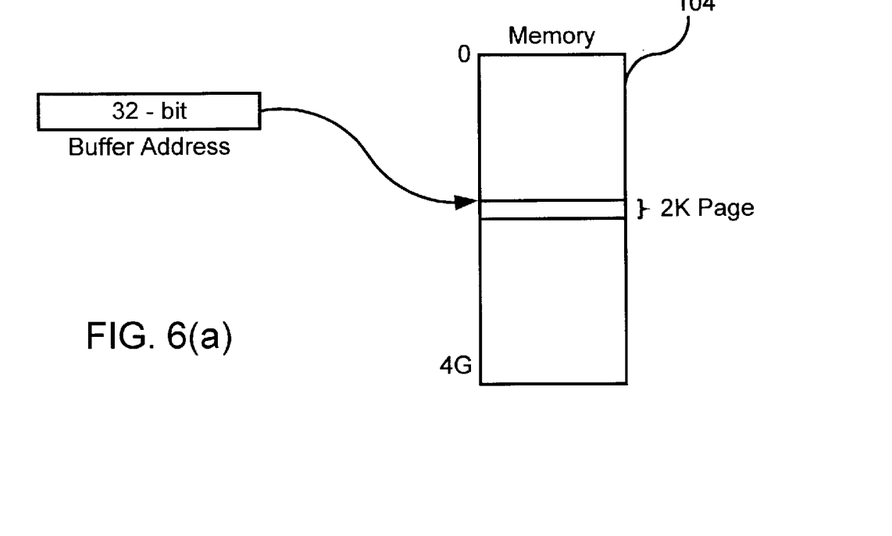
FIGS. 6(a) and 6(b) show respective examples of addressing schemes for the primary storage medium and for the intermediate storage medium.
Figure 6B:
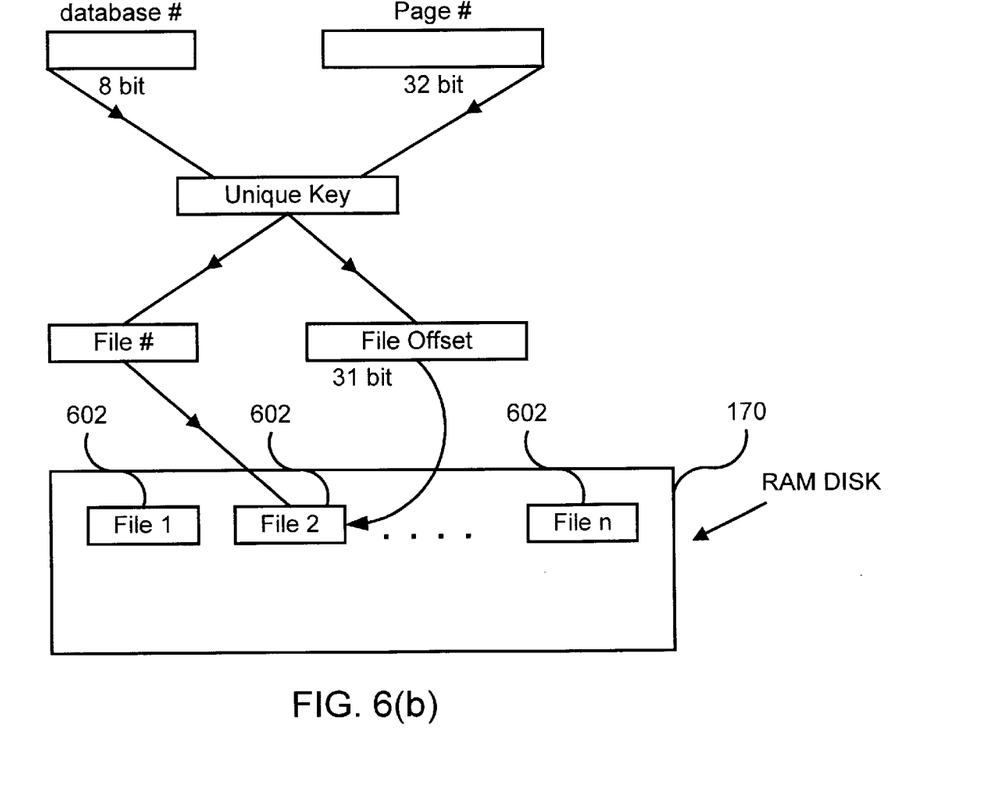

FIG. 6(*a*) shows an example of a 32 bit address length. IN the example, however, the operating system only allows the DBMS to access 4 gigabytes. In the example, each page is 2 K FIG. 6(*b*) shows an example of an address for intermediate storage medium 170. An 8 bit database number and a 32 bit page number combine to form a unique key for the requested data. Each file 602 is implemented as a buffer of FIG. 4. Each file is accessed by way of a file number and a file offset.

In summary, the present invention incorporates an intermediate storage medium, such as an internal RAM disk, an external RAM disk, or an extended memory. During a read operation, when a primary storage medium is full, the DBMS moves data from the primary storage medium to the intermediate storage medium to make room in the primary storage medium for the newly read data Moving data to an intermediate storage medium instead of a slow secondary medium allows the system to maintain the benefits of having previously read data in the intermediate storage medium. The existence of the intermediate storage medium is not transparent to the DBMS and migration of data between the storage mediums 104, 170, and 180 are under control of the DBMS.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for accessing a database, comprising the steps, performed by a database management system stored in a secondary storage medium, of a data processing system, of:

receiving a request to read database data located in the database;

when a primary storage medium is full, determining which database data needs to be discarded from the primary storage medium to make room for more data;

storing the database data to be discarded into an intermediate storage medium; and reading the database data, after the storing step, into the primary storage medium from one of the intermediate storage medium and the secondary storage medium.

2. The method of claim 1, further comprising the steps of:

receiving a request to read database data located in the database;

determining whether the requested database data is stored in a primary storage medium;

when the requested database data is stored in the primary storage medium, reading the database data from the primary storage medium;

when the requested database data is not stored in the primary storage medium, determining whether the requested database data is stored in an intermediate storage medium;

when the requested database data is stored in the intermediate storage medium, reading the database data from the intermediate storage medium; and when the requested database data is not stored in the intermediate storage medium, reading the database data from a secondary storage medium.

3. The method of claim 2, wherein the intermediate storage medium has approximately the same access time as the primary storage medium.

4. The method of claim 2, wherein the memory capacity of the database is larger than the memory capacity of the primary storage medium.

5. The method of claim 2, wherein the intermediate storage is one of an internal RAM disk, an external RAM disk, and an extended memory.

6. An apparatus for accessing a database, comprising:

a DBMS that manipulates data stored in the database;

a primary storage medium;

an intermediate storage medium having a first access time;

a secondary storage medium having a second access time that is longer than the first access time; and a data migration portion for, in accordance with a request from the DBMS, moving a piece of the data from the primary storage medium to the intermediate storage medium when the primary storage medium is full.

7. The apparatus of claim 6, wherein the intermediate storage medium has approximately the same access time as the primary storage medium.

8. The apparatus of claim 6, wherein the memory capacity of the database is larger than the memory capacity of the primary storage medium.

9. The apparatus of claim 6, wherein the intermediate storage is one of an internal RAM disk and an extended memory.

10. The apparatus of claim 6, wherein the intermediate storage is an external RAM disk.

11. A computer program product comprising:

a computer usable medium having computer readable code therein for accessing a database, the computer program product comprising:

computer readable program code devices configured to cause a computer to effect receiving a request to read database data located in the database;

computer readable program code devices configured to cause a computer to effect, when a primary storage medium is full, determining which database data needs to be discarded from the primary storage medium to make room for more data;

computer readable program code devices configured to cause a computer to effect storing the database data to be discarded into an intermediate storage medium; and computer readable program code devices configured to cause a computer to effect reading the database data, after the data to be discarded is stored, into the primary storage medium from a one of the intermediate storage medium and the secondary storage medium.

* * * * *